May 4, 1965 J. THÉVENAZ 3,181,807
CINEMATOGRAPHIC CAMERA
Filed March 12, 1963

INVENTOR
JEAN THÉVENAZ
BY Emery L. Groff
ATTY

United States Patent Office 3,181,807
Patented May 4, 1965

3,181,807
CINEMATOGRAPHIC CAMERA
Jean Thévenaz, Grandson, Switzerland, assignor to Paillard S.A., Vaud, Switzerland, a corporation of Switzerland
Filed Mar. 12, 1963, Ser. No. 264,494
Claims priority, application Switzerland, Mar. 31, 1962, 3,916/62
2 Claims. (Cl. 242—71.2)

The present invention concerns a ciné-camera.

In one known construction a photographic apparatus is provided with a take-up spool having a crown of blades wherein the film is intended to penetrate between two successive blades to be secured to the said crown of blades.

It is, however, necessary by this known construction to manually introduce the film end between two consecutive blades in order to be sure that the film is correctly secured to the crown of blades or take-up spool.

It thus results that the solution cannot be used in cinematographic cameras where it is desired to have an automatic attachment of the film to the take-up spool.

An object of the invention is to provide means ensuring an automatic and reliable attachment of the film to the take-up spool in a cinematographic camera, particularly of the double eight size type.

Another object of the invention is to provide take-up means in a cinematographic camera of the above mentioned type in which the film cannot be withdrawn from the camera when it is only half exposed.

According to the present invention a cinematographic camera, particularly of the double eight size type, comprising a shaft adapted to receive a film feeding spool, a film gate, a driving mechanism for intermittent motion of the film, a crown of blades set in rotative motion for taking up the film, the free end of said film being adapted to engage the crown of blades is characterised in that the medial plane of each blade is tangential with a virtual co-axial cylinder of smaller diameter than the internal diameter of the crown, the slope of the blades being such that the medial plane of each blade makes the larger possible angle with the plane of the film gate, when said medial plane cuts the outlet portion of said film gate.

The invention will now be described further, by way of example, with reference to the accompanying drawings, in which.

Figure 1:
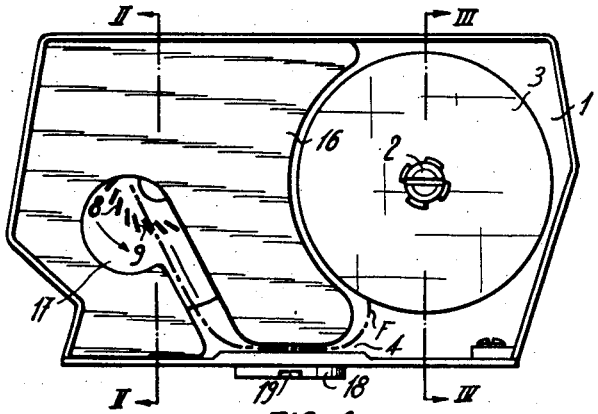
FIGURE 1 is a side view of a camera casing shown without its cover.

The case shown in FIGURE 1 is intended for a camera of double eight size, in which the case is mounted to pivot relatively to a part supporting the object lens in such manner that when the first half of the film has been exposed, it is only necessary to turn the case through 180° relative to the said part to expose the second half of the film.

The case 1 supports a shaft 2 adapted to receive a feed spool 3 for a film F. At the outlet of this spool 3 the film F passes into a passage or film gate 4. At the outlet of this passage 4, the film reaches winding means which are formed by a type of take-up spool mounted to turn on a spindle 5. This spool comprises a hub 6 and a single cheek 7, one side of which carries a series of members 8 disposed over a cylindrical surface in such manner as to leave free between them a series of oblong spaces 9 which are parallel to the spindle 5. These members 8 have the form of blades, which are arranged in a crown and are perpendicular to the cheek 7. The blades 8 are equidistant and the plane of each blade, if extended inwardly, is tangential to an imaginary cylinder co-axial with the spindle 5 and of smaller diameter than the crown. The inclination of each blade relative to a radial plane from the spindle 5 is selected such that the free end of the film issuing from the film passage 4 arrives between two blades following a direction appreciably parallel to these blades. In other words, the diameter of the aforementioned imaginary cylinder is selected in such manner that the tangent to this cylinder, which tangent passes along the plane of the blade, is disposed in the direction of the outlet of the passage, this tangent resting on the cylinder in the direction where it forms the greatest angle with the plane of the passage as will be most clearly evident upon a review of the left-hand portion of FIG. 1 wherein the film F is represented by a dot-dash line.

The cheek 7 has, on its other side, teeth 10 which engage with a pinion 11, ensuring, by means (not shown) the driving in rotation of the rim of blades 8.

Figure 2:
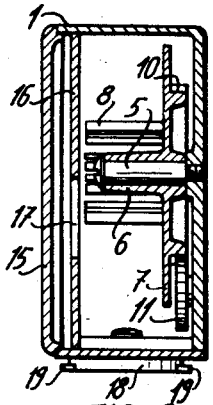
FIGURE 2 is a cross-section on the line II—II of FIGURE 1.
Figure 3:
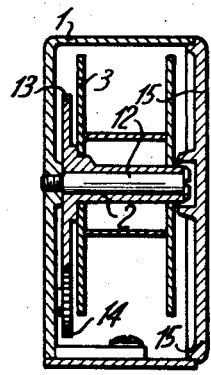
FIGURE 3 is a section on the line III—III of FIGURE 1.

FIGURE 3 is a section on an axial plane of the feed spool 3 and shows that the latter is fixed in known manner on a shaft 2 which is mounted to turn on a pivot 12. The shaft is integral with a toothed wheel 13 which meshes with a pinion 14 ensuring the rotary drive of the spool 3 by a driving means (not shown). In the cross-sections shown in FIGURES 2 and 3, the case 1 is illustrated in a position closed by a cover 15.

The winding device is covered by a fixed plate 16 having an opening 17 exposing the space between the outlet of the passage 4 and the blades 8.

The case 1 on its lower wall has a projection 18 forming a bayonet type connecting piece and having two lateral bolts 19 making it possible to connect the case 1 pivotably with the rest of the apparatus which is not shown.

When the camera is loaded the user places in position a spool 3 loaded with a film to be exposed and passes the free end of this film into the passage 4 and introduces it laterally through the opening 17 formed in the plate 16, into the space between two blades 8 of the cheek 7. It will be seen that this operation is very easy to effect. The user can then close the case 1 with its cover 15 and proceed to focus it after having operated the camera with a certain length of unused film constituting the start, as is well known. When the camera is in a position permitting the first half of the film to be exposed, the cheek 7 is rotated by means of a friction device (not shown) to ensure the winding of the film round the crown of blades 8. The spool 3 may, on the other hand, turn freely so that the film unwinds without effort therefrom at the same rate as the intermittent driving mechanism (not shown), feeds the portion of film which is in the passage 4.

When the first half of the film has been exposed, the user pivots the case 1 through 180° relative to the rest of the camera to permit exposure of the second half of the film. In this new position of the case relatively to the camera, the spool 3 is rotated by means of the pinion 14, whilst the cheek or plate 7 is disengaged from the driving means so that it can turn freely. The film which had been wound on the crown of the blades 8 can, therefore, unwind to be rewound on the spool 3. At the end of the exposure of a second half of the film, it will be seen that the film can freely leave the space between the blades 8 so that the only operation to be effected by the user consists in withdrawing the spool 3 from the apparatus when the film has been completely exposed.

Figure 4:
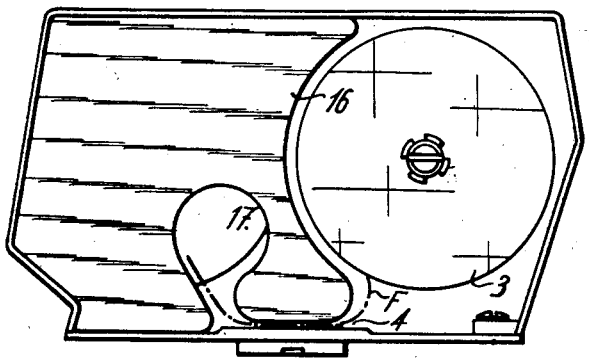
FIGURE 4 is a view similar to FIGURE 1, but showing a different embodiment.
Figure 5:
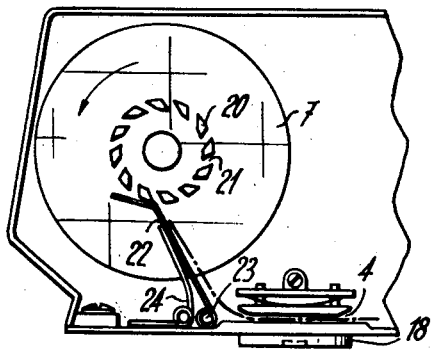
FIGURE 5 is a view of a detail of a part of FIGURE 4, one plate being removed.
Figure 6:
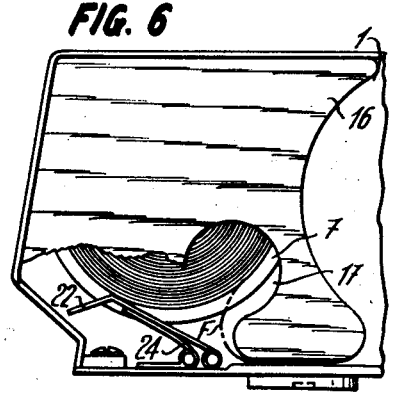
FIGURE 6 is a view corresponding to FIGURE 5 showing the winding device when a predetermined length of film has been wound.

In the second embodiment shown in FIGURES 4 to 6, the proposed arrangement enables the film to be introduced automatically into the winding means. These means also comprise a cheek or plate 7 provided with a hub 20 in which a series of slots 21 are provided. These slots are inclined in the same manner as the spaces 9 between the blades 8 of the first embodiment. These slots 21 are defined by pairs of parallel juxtaposed faces of the upstanding portions forming the hub 20. These portions constitute a crown of blades.

A blade 22 is pivotably connected at 23 and biased by a spring 24 keeping it pressed tangentially against the hub 20 of the plate 7. The object of this blade is to guide the film issuing from the passage 4 to bring the end thereof into contact with the hub 20. In this manner, as soon as the film has been introduced into the passage 4, the user can start the driving mechanism of the film and the end of the film comes into contact with the hub 20 whilst the latter is being rotated. This end is therefore necessarily introduced into the slots 21 which pass in front of it and in this manner it becomes easily attached. It will also be observed that the blade 22 is bent near its point of contact with the hub 20 so that when the film is wound on this hub, it progressively repels the blade 22 against the action of the spring 24. The force exerted by the spring 24 on the blade 22 permits the latter to occupy a position appreciably tangential to the greatest diameter of the wound film rotated on the hub, as may be seen in FIGURE 6.

In this second embodiment, the opening 17 is much smaller, for it simply constitutes an aperture making it possible to observe whether, at the moment the camera is loaded, the film is suitably controlled. However, it will be possible to completely eliminate this opening in the plate 16.

Obviously, modifications could be made to the embodiment and, in particular, the embodiment according to FIGURES 1 to 3 could be provided with a device guiding the end of the film to the outlet of the passage 4, for example in the same manner as that formed by the blade 22 shown in FIGURE 5. The blade 22 could also be retained by a stop member before coming into contact with the blades 8 or the hub 20.

I claim:
1. A motion picture camera having support means for a film feeding spool and take-up means for the film which has been fed by the feed spool, said take-up means comprising; a circular cheek plate rotatably mounted upon said support means, a plurality of outstanding elements each mounted on one of their ends to one side of said plate and disposed equidistantly from the center axis of said plate, said elements spaced from each other to provide therebetween a plurality of slots parallel to the plate center axis, a fixed plate supported opposite the free ends of said elements, said fixed plate provided with a slot extending from a point adjacent said elements to a point beyond the periphery of said cheek plate and to the periphery of the fixed plate to permit the lateral introduction of the film into one of said slots.

2. A camera according to claim 1, wherein, each of said slots formed between two of said adjacent elements is inclined in relation to a radial plane passing from said center axis through said slot, and said inclination is in a direction so that the outer edge of said slots is disposed forward of the inner edge, in the direction of rotation of said cheek plate.

References Cited by the Examiner

UNITED STATES PATENTS

| | | | |
|---|---|---|---|
| 1,346,356 | 7/20 | Wenderhold | 242—76 |
| 2,095,849 | 10/37 | Wittel | 242—71.1 X |
| 2,225,433 | 12/40 | Goldberg. | |
| 3,090,574 | 5/63 | Doncaster et al. | 242—55.13 |
| 3,100,090 | 8/63 | Goodell et al. | 242—55.13 |

OTHER REFERENCES

Meier, German application, 1,084,674, printed July 7, 1960 (Kl 7b 5/30).

MERVIN STEIN, *Primary Examiner.*